Sept. 27, 1966  W. C. BELK  3,275,052
METHOD OF SECTIONIZING CITRUS FRUIT
Original Filed March 9, 1961  12 Sheets-Sheet 1
FIG_1
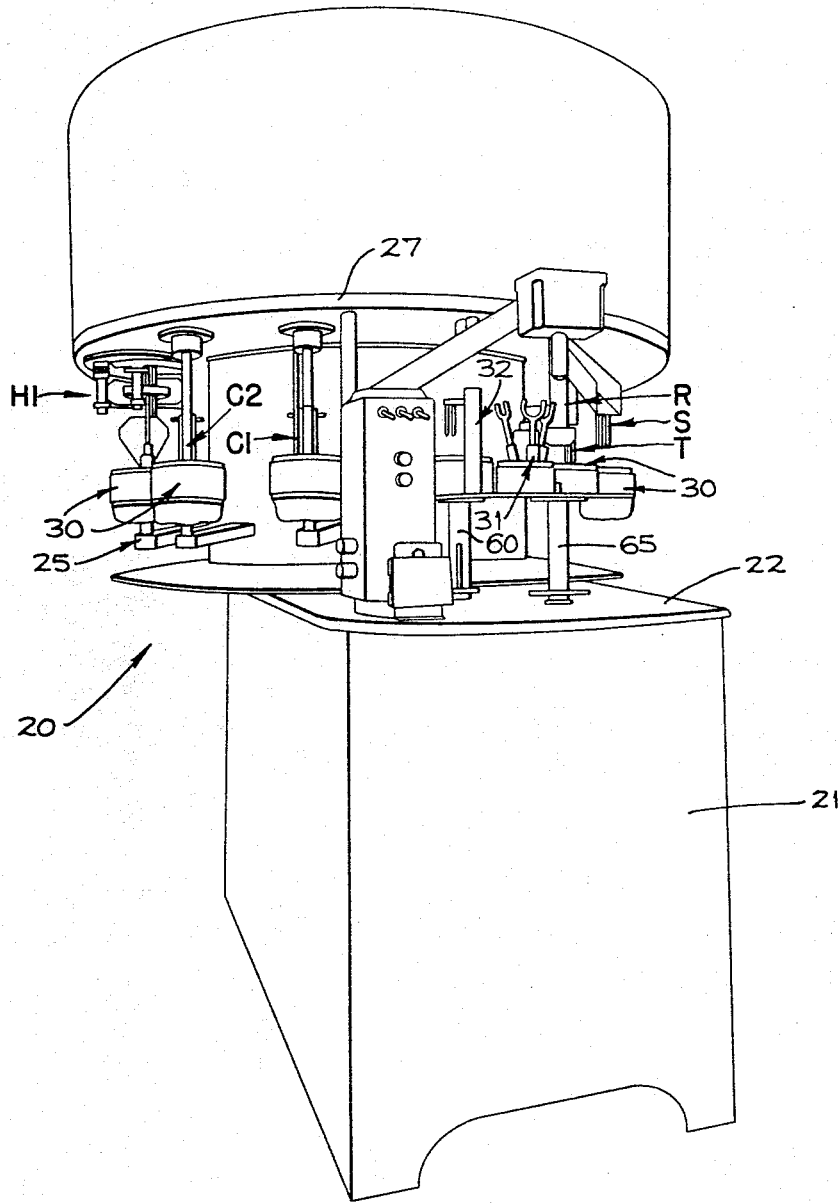
INVENTOR
WILBER C. BELK
BY Francis W. Anderson
ATTORNEY

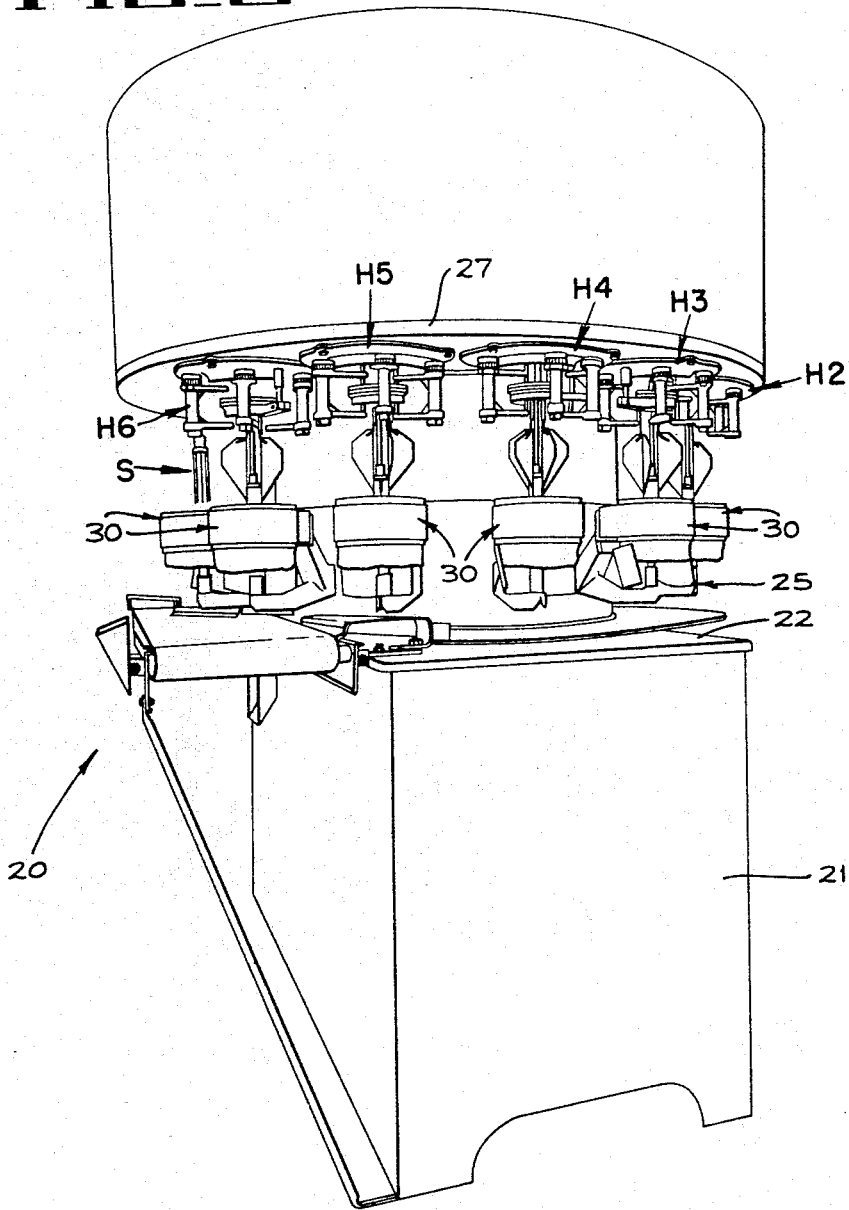
FIG_2

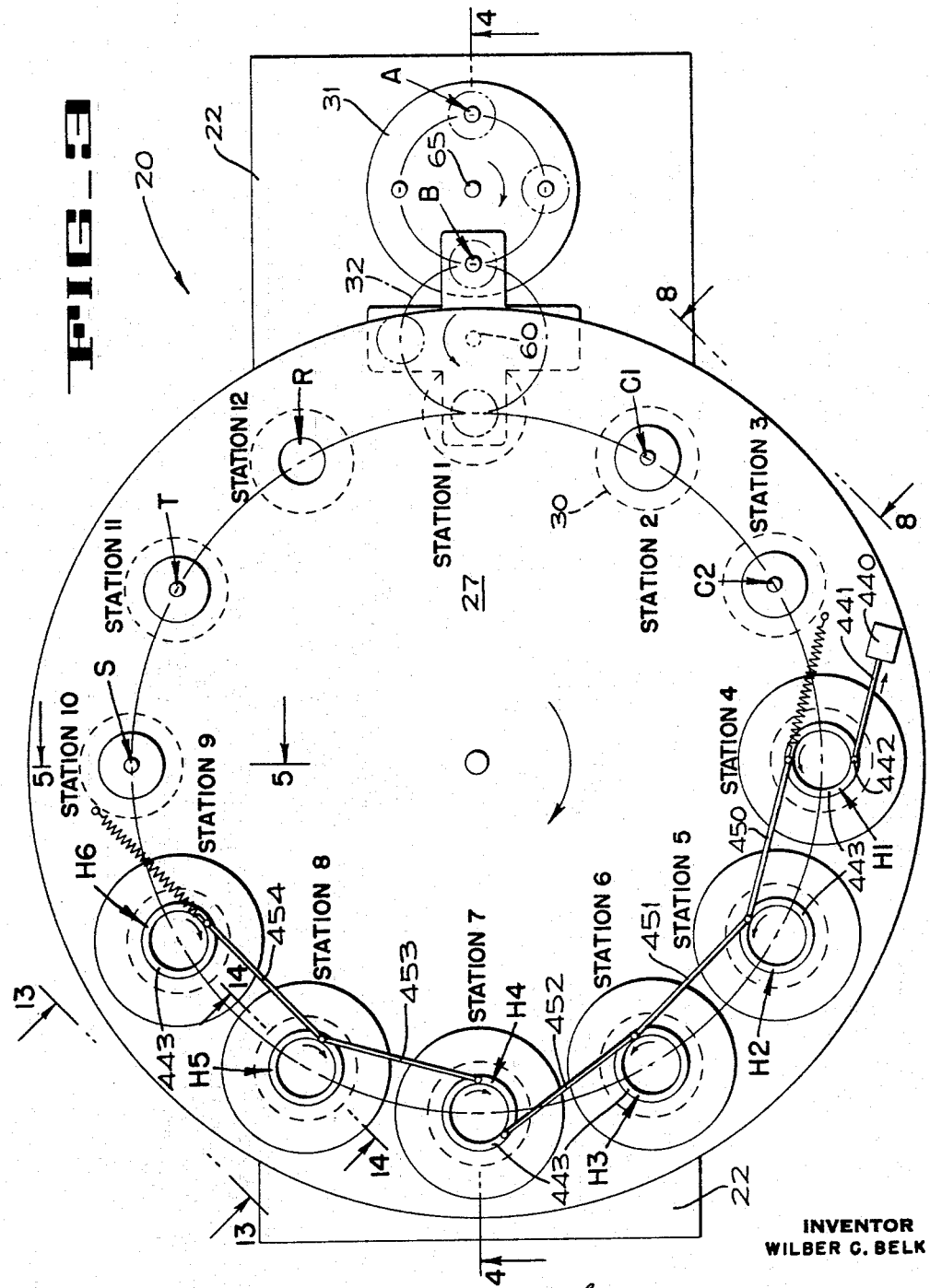

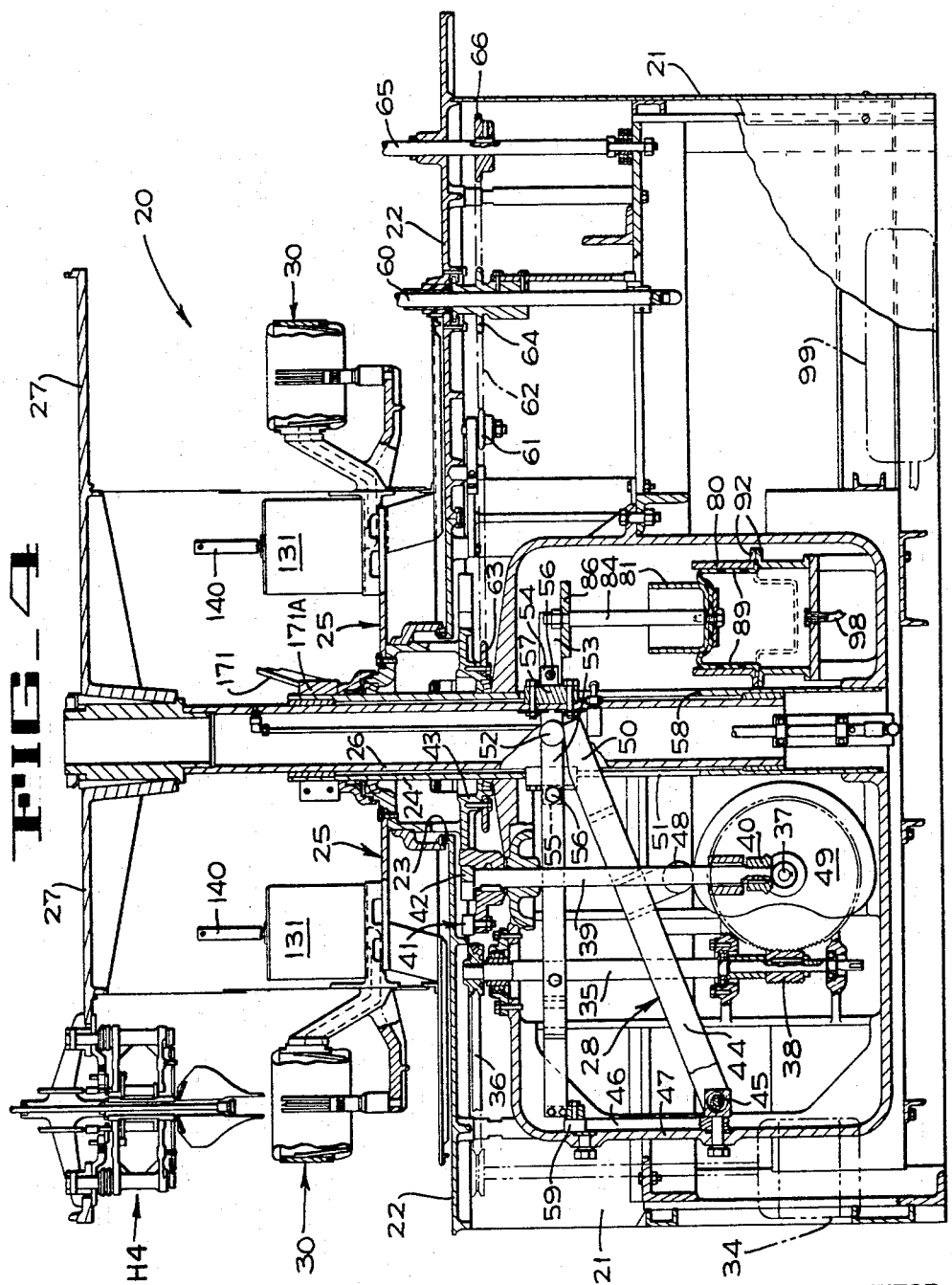

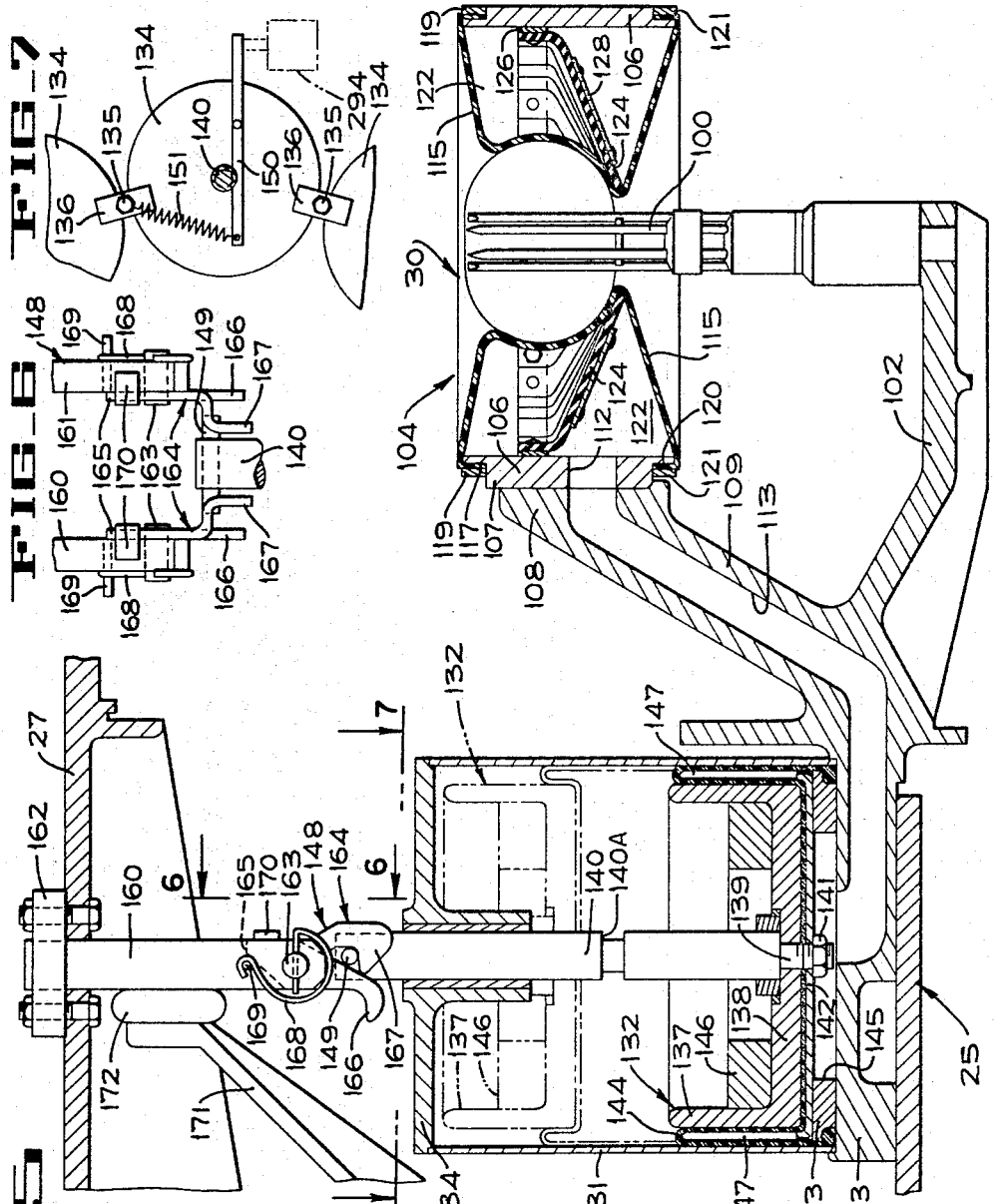

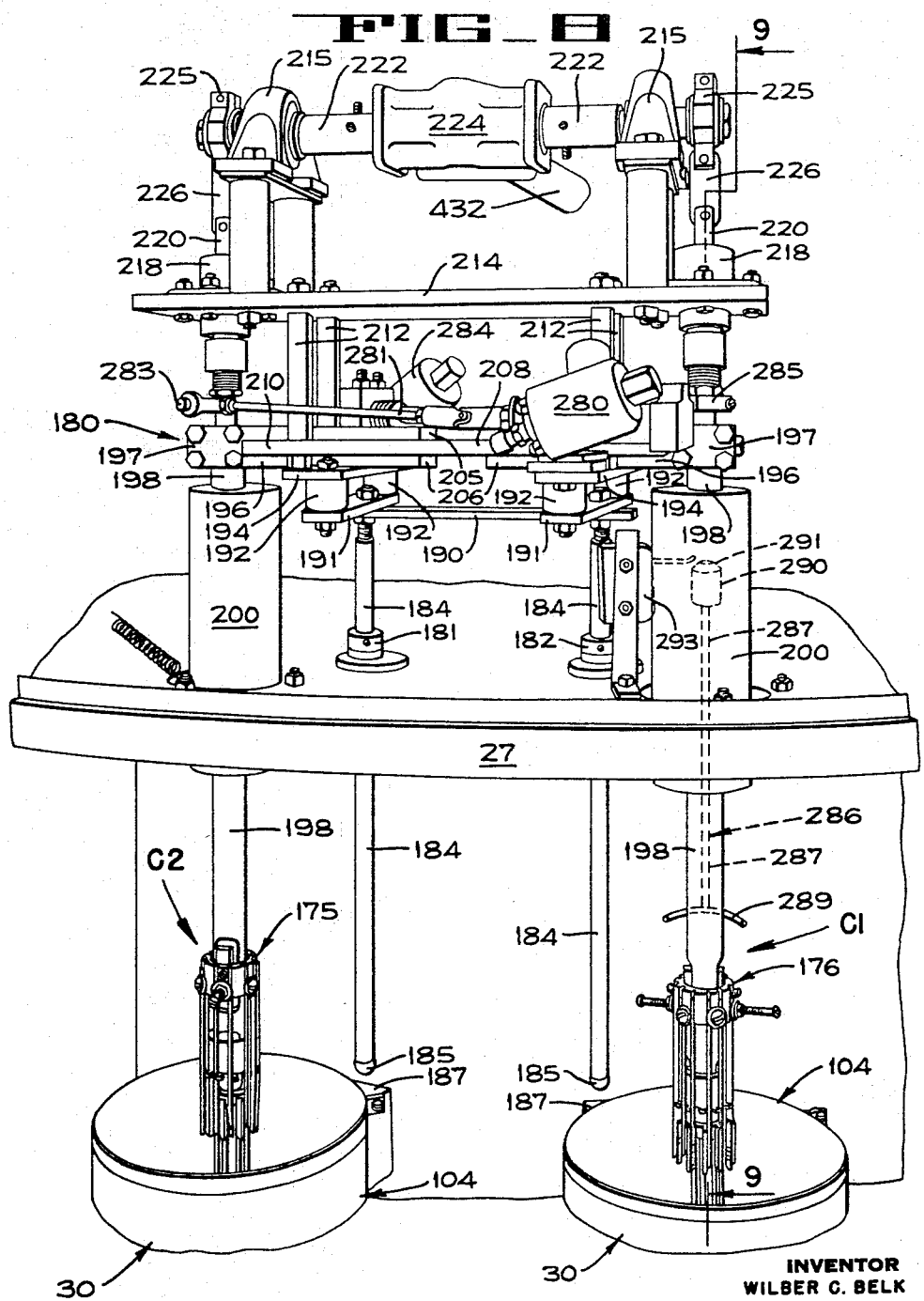

Sept. 27, 1966 W. C. BELK 3,275,052
METHOD OF SECTIONIZING CITRUS FRUIT
Original Filed March 9, 1961 12 Sheets-Sheet 7
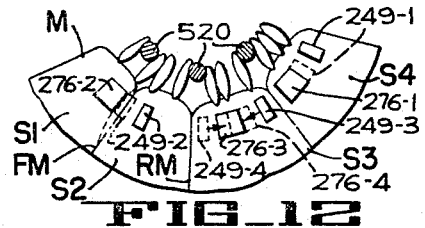
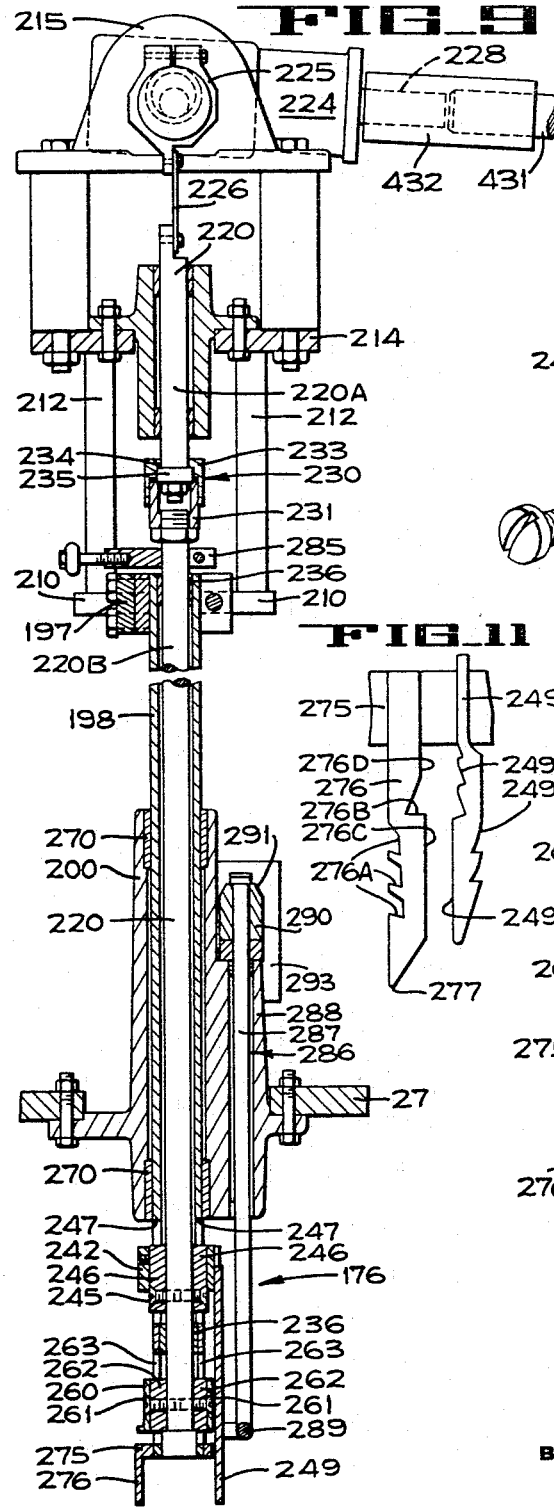
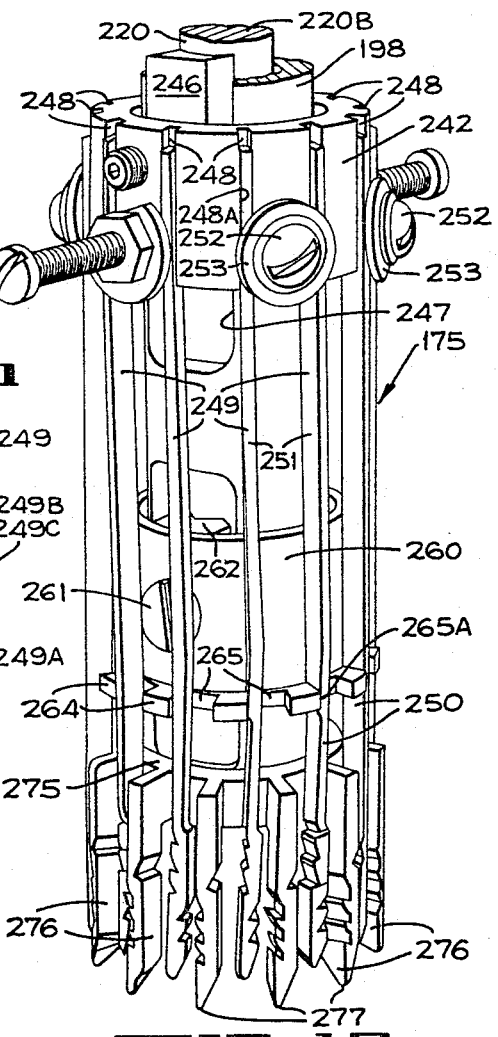
INVENTOR
WILBER C. BELK
BY Francis W. Anderson
ATTORNEY

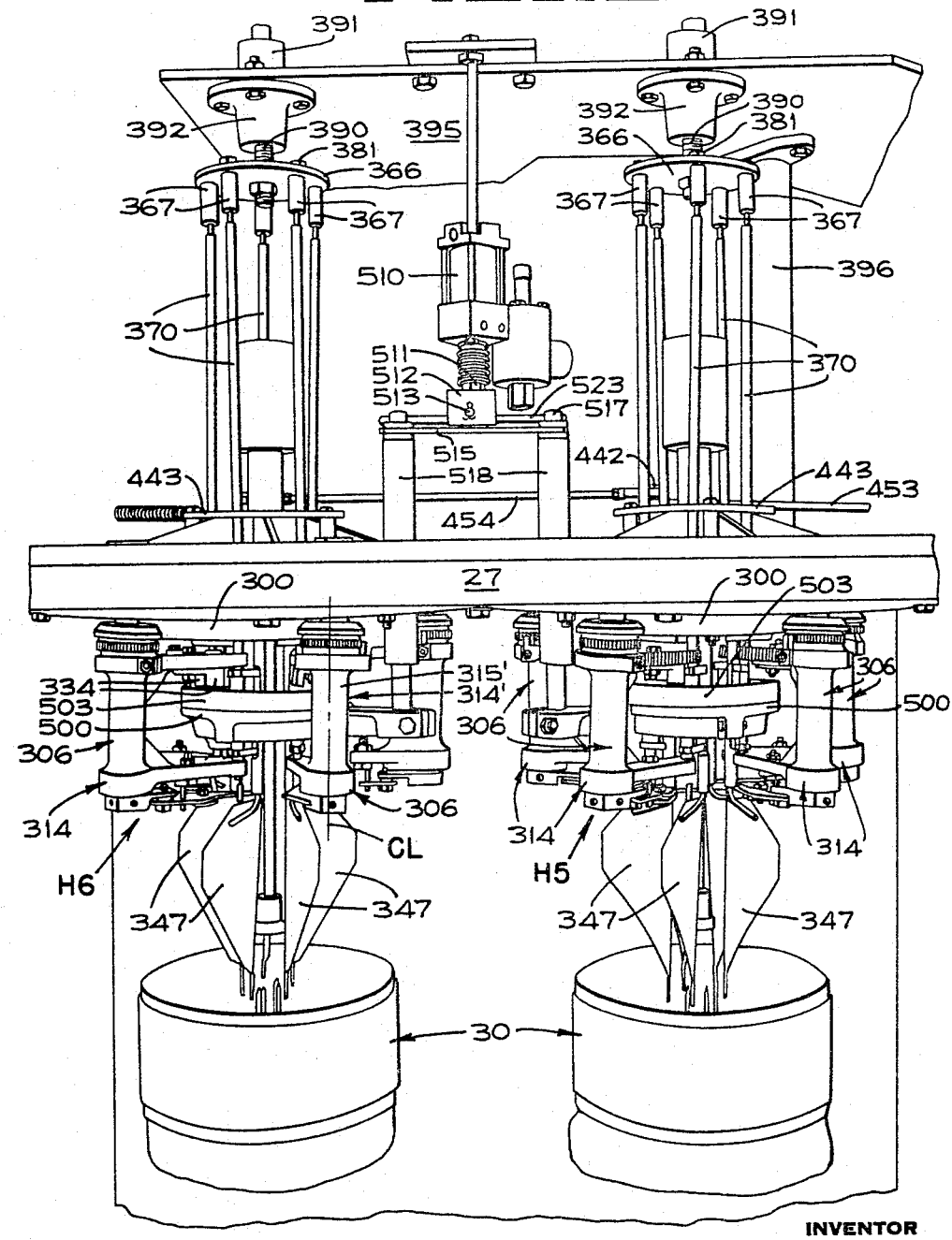

Sept. 27, 1966 W. C. BELK 3,275,052
METHOD OF SECTIONIZING CITRUS FRUIT
Original Filed March 9, 1961 12 Sheets-Sheet 9
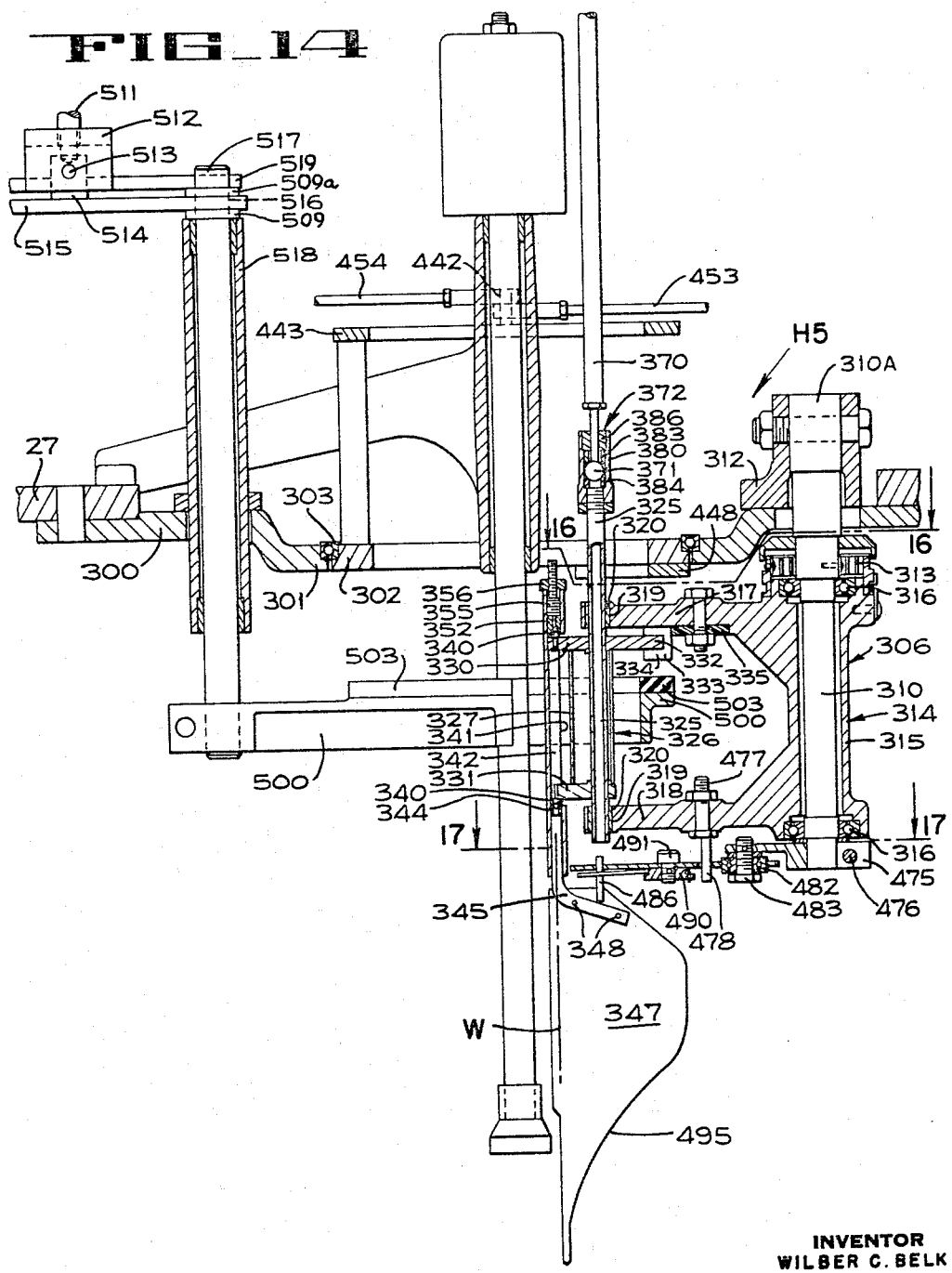
INVENTOR
WILBER C. BELK
BY Francis W. Anderson
ATTORNEY

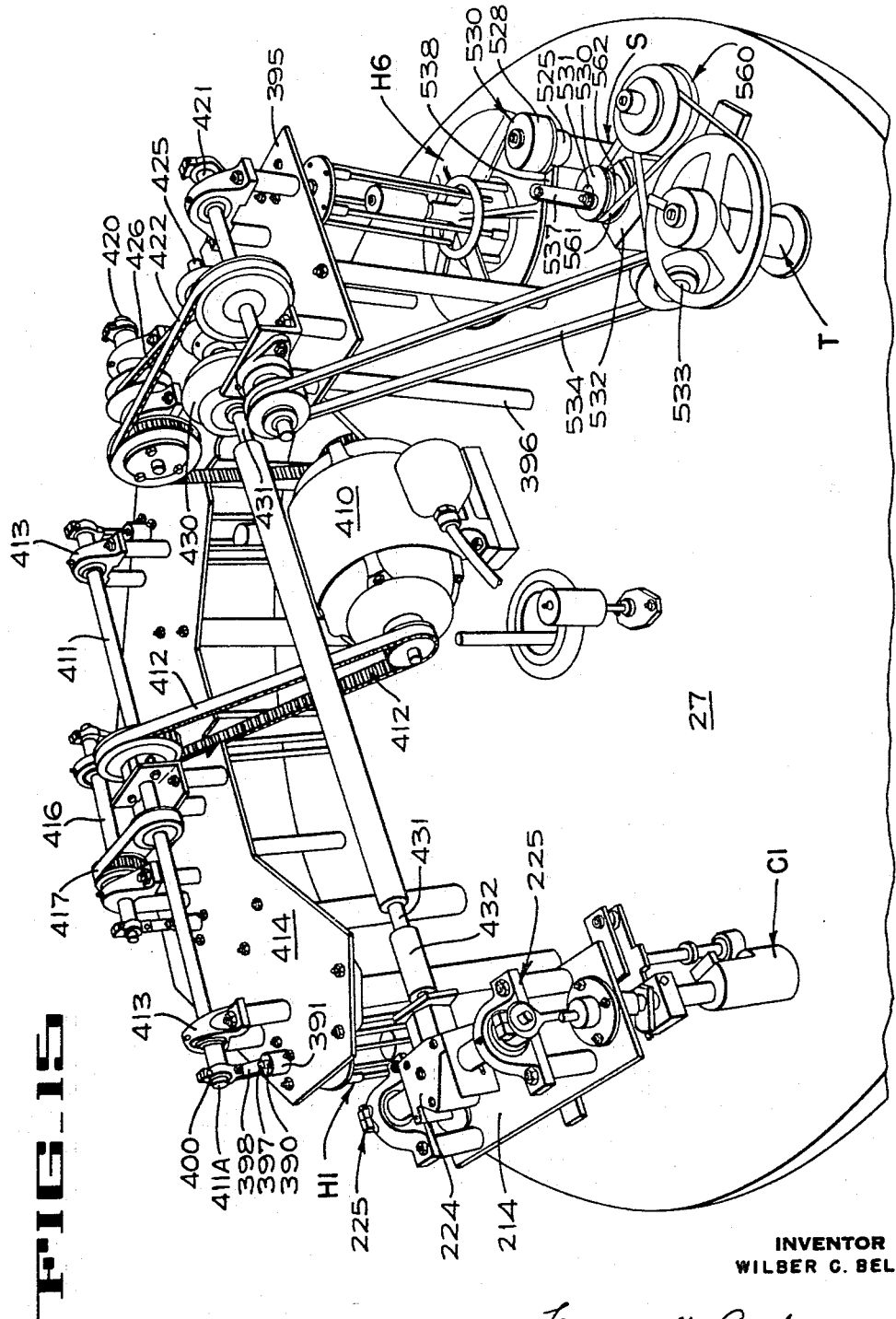

Sept. 27, 1966           W. C. BELK           3,275,052
METHOD OF SECTIONIZING CITRUS FRUIT
Original Filed March 9, 1961          12 Sheets-Sheet 11
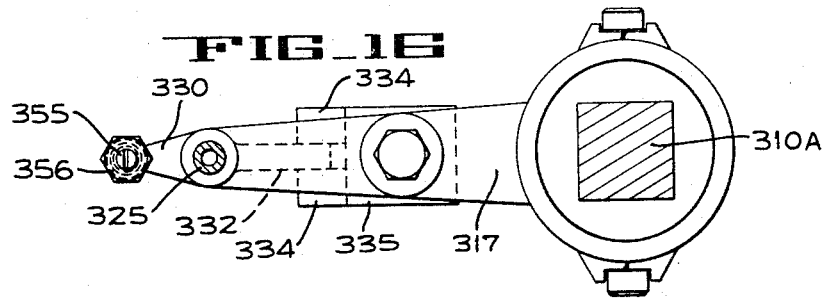
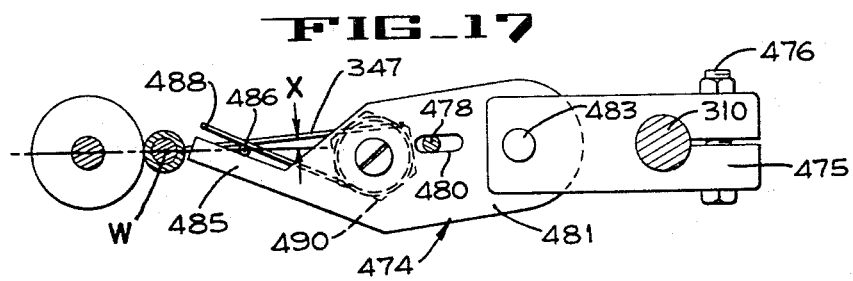
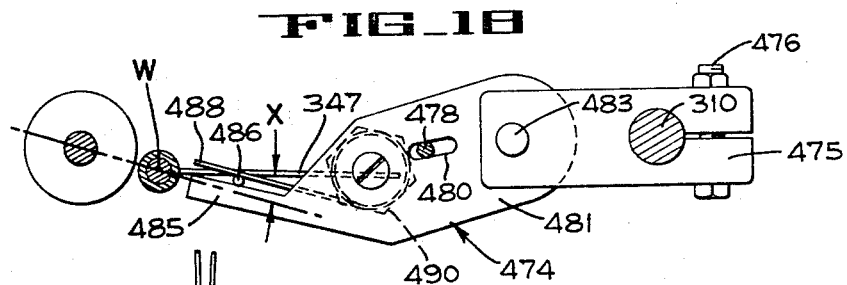
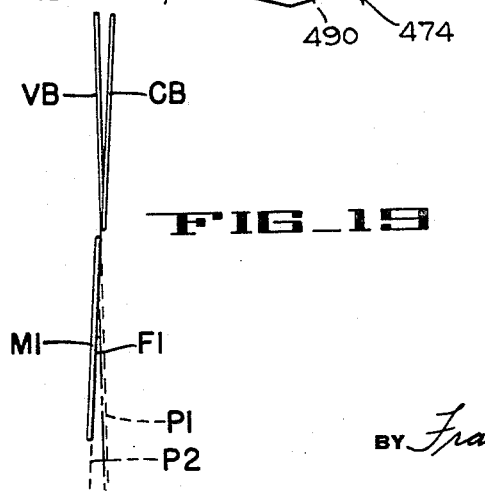
INVENTOR
WILBER C. BELK
BY Francis W. Anderson
ATTORNEY

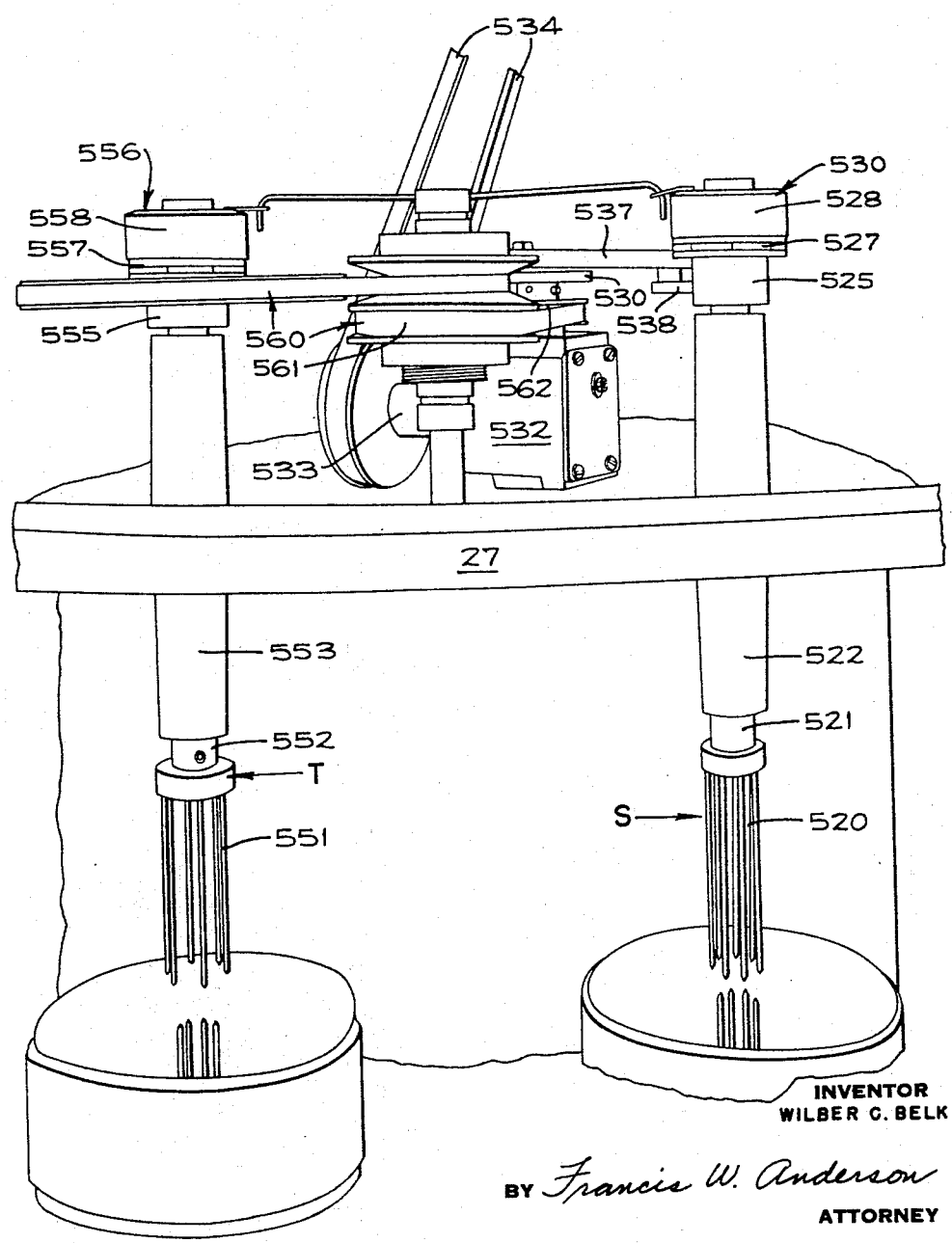

United States Patent Office 3,275,052
Patented Sept. 27, 1966

3,275,052
METHOD OF SECTIONIZING CITRUS FRUIT
Wilber C. Belk, Lakeland, Fla., assignor to FMC Corporation, a corporation of Delaware
Original application Mar. 9, 1961, Ser. No. 109,798. Divided and this application Aug. 17, 1964, Ser. No. 395,350
10 Claims. (Cl. 146—236)

The present application is a division of the application to Wilber C. Belk, Serial No. 109,798, filed March 9, 1961, now abandoned.

The present invention pertains to a method of sectionizing citrus fruit and an improved apparatus for carrying out the method.

In the process of sectionizing citrus fruit, such as grapefruit, the fruit is first peeled and then subjected to a lye treatment to remove the tough membrane that encircles the entire periphery of the fruit. During this peeling operation, it often happens that some peel is not removed from the blossom end of the fruit. When such fruit is subjected to the lye treatment, the peel remaining on the fruit prevents the lye from contacting the membrane at the blossom end of the fruit. As a result, when the fruit reaches the sectionizing machine, the membrane is still intact. In one type of sectionizing machine, a sectionizing blade which has a probe at its lower end is used. At the start of a sectionizing operation, the probe is first moved down into a grapefruit at the blossom end to penetrate into a V-shaped meat segment at the apex of the segment. When the probe has penetrated a short distance into the segment, it is moved laterally to "find" the adjacent radial membrane of the fruit so that, during subsequent downward movement, the blade will lie close to the membrane. If the peripheral membrane is still intact when the lateral movement of the probe is started, it combined with the juice sacs in the fruit resist the lateral movement of the probe. If the force with which the probe is moved laterally is made great enough to overcome this resistance, it will also break through the radial membrane which it is trying to "find." Similarly, if the probe is provided with sharp teeth to cut through the juice sacs and the peripheral membrane, it may also cut through the radial membrane.

Accordingly, it is an object of the present invention to provide a method of removing the peripheral membrane, at the blossom end of a citrus fruit, from the path of movement of sectionizing blades of a sectionizing machine.

Another object is to provide an improved method of removing seeds from citrus fruit.

Other and further objects and advantages of the present invention will be apparent from the following description taken in connection with the accompanying drawings, in which:

FIG. 1 is a diagrammatic perspective view taken looking at one end of the citrus fruit sectionizing machine of the present invention.

FIG. 2 is a diagrammatic perspective view taken looking at the end of the machine opposite to that shown in FIG. 1.

FIG. 3 is a schematic top plan view of the machine of FIG. 1.

FIG. 4 is a diagrammatic longitudinal vertical section taken on line 4—4 of FIG. 3.

FIG. 5 is a fragmentary, enlarged vertical diagrammatic section taken along line 5—5 of FIG. 3.

FIG. 6 is a fragmentary diagrammatic side elevation of a portion of the mechanism of FIG. 5, the view being taken looking in the direction of arrows 6—6 of FIG. 5.

FIG. 7 is a diagrammatic sectional view of a portion of the mechanism of FIG. 5, the view being drawn at a reduced scale and taken on line 7—7 of FIG. 5.

FIG. 8 is a diagrammatic perspective of a portion of the machine, the view being taken looking in the direction of arrows 8—8 of FIG. 3.

FIG. 9 is a more or less diagrammatic vertical section, with parts broken away, taken on line 9—9 of FIG. 8.

FIG. 10 is a diagrammatic perspective of one of the two path cutting units used in the machine of FIG. 1.

FIG. 11 is a fragmentary enlarged diagrammatic side elevation of the lower ends of two of the blades on the path cutting unit of FIG. 10.

FIG. 12 is a fragmentary diagrammatic plan view showing a portion of a grapefruit and operative positions of the blades of the path cutting heads.

FIG. 13 is a diagrammatic perspective of a portion of the machine, the view being taken looking in the direction of arrows 13—13 of FIG. 3.

FIG. 14 is a fragmentary, enlarged diagrammatic vertical section taken on line 14—14 of FIG. 3.

FIG. 15 is a diagrammatic perspective looking downwardly at the drive mechanism on the top of the machine of FIG. 1.

FIG. 16 is a fragmentary diagrammatic section taken on line 16—16 of FIG. 14.

FIGS. 17 and 18 are diagrammatic sectional views taken on line 17—17 of FIG. 14, particularly showing two operating views of the blade control mechanism of the present invention.

FIG. 19 is a diagrammatic sketch showing operating positions of sectionizing blades, that are canted in accordance with the present invention, relative to a membrane of a citrus fruit.

FIG. 20 is a diagrammatic perspective taken looking downwardly at the mechanism mounted on the top of the machine at Station 10.

The sectionizing machine 20 of the present invention comprises a base 21 (FIGS. 1 and 4) having a fixed table top 22 that has a central opening 23. A stationary tubular post 24 is secured in the base and projects upwardly through the opening 23. Near the upper end of the post 24, a main turret 25 is mounted for rotation around the post, and an inner tubular post 26 is slidably journalled inside the main post 24 in suitable bushings. A circular tool carrier plate 27 is mounted on the upper end of the slidable post 26 which is arranged to be raised and lowered by a lift mechanism 28. When the tool carrier 27 is raised and lowered, it moves several fruit processing units mounted thereon into and out of engagement with fruit held in twelve fruit carriers 30 which are mounted around the periphery of the turret 25 at twelve equi-spaced positions designated as Stations 1–12 in the plan view of FIG. 3. The fruit processing units include a first path cutter C1 (FIG. 1) at Station 2, a second path cutter C2 at Station 3, six sectionizing heads H1–H6 (FIGS. 2 and 3) at Stations 4–9 respectively, a fruit shaker S at Station 10, a spinner T (FIG. 1) at Station 11, and a core remover R at Station 12. There is no fruit processing unit on the tool carrier 27 at Station 1 since, at this station, the only operation that takes place is the depositing of a fruit in the carrier. Also mounted above the table top 22 is a fruit feed turret 31 and a transfer turret 32.

During operation of the machine 20, fruit to be sectionized are advanced on a supply conveyor (not shown) to a point within reach of an operator who is positioned adjacent the feed turret 31 (FIG. 3). The operator places the grapefruit, one by one, on the feed turret at Station A, said turret being arranged to the intermittently indexed through 90° angular movements in a clockwise direction (FIG. 3) to bring each grapefruit to a transfer Station B where the fruit is automatically transferred from the feed turret to a transfer turret 32 which is also arranged to be intermittently indexed in 90° increments in synchronism with the movements of feed turret 31, but in a counterclockwise direction. The grapefruit is then moved to a Station 1 of the main turret where it is deposited in one of the fruit carriers 30.

The main turret 25 is arranged to be intermittently indexed through 30° angular increments in a clockwise direction (FIG. 3) to move the grapefruit successively to the twelve stations of the machine.

The feed turret 31 and the transfer turret 32 are identical to the feed and transfer turrets of the sectionizing machine disclosed in the copending U.S. application of H. W. Grotewold, Ser. No. 730,335, filed April 23, 1958, now Patent No. 3,072,160, and assigned to the assignee of the present invention. Since these turrets do not form part of the present invention, they will not be described in detail, however, reference may be had to the above-identified application for a complete description of any mechanisms of the present machine that is not described herein in detail.

The drive mechanism for the machine is mounted in the base 21 and includes a motor 34 that is shown in phantom lines in sectional view FIG. 4 since it is located ahead of the plane of this section. The motor drives a vertical shaft 35 through a belt and pulley drive 36. A horizontal shaft 37, which is driven from shaft 35 through a worm gear unit 38, drives a second vertical shaft 39 by means of a bevel gear unit 40. The vertical shaft 39 effects intermittent movement of the main turret 25 through a Geneva drive mechanism 41 which has a driven gear 42 formed on a lower hub portion 43 of the turret 25.

The lift mechanism 28 which controls the raising and lowering of the inner slidable tubular post 26 comprises a lever 44 pivotally mounted at 45 on the lower end of a vertical guide bar 46 that is bolted to a rigid wall 47 of the base 21. A roller follower 48, that is carried by the lever 44, rides along the surface of a cam 49 which is keyed to shaft 37. The lever 44 has a yoke 50 formed on its outer end which engages two diametrically opposed rollers 52 (one only being shown) that are carried by a pair of parallel bars 53. The bars 53 are secured together by two transverse bars 54 and 55 to which the bars 53 are secured by capscrews 56. A pad 57, formed on transverse bar 54, projects through an opening 58 in the stationary post 24 and is bolted to the inner slidable post 26. The transverse bar 55 is bolted to the slidable post 26 in the same manner. Thus, when the cam 49 is rotated, the lift mechanism 28 raises and lowers the slidable post 26 by means of the collar formed by the parallel bars 53 and transverse bars 54 and 55.

To prevent rotation of the post 26 while it is being raised and lowered, two rollers 59 (one only being shown) are mounted on the ends of the bars 53, one roller being disposed on each side of the fixed guide bar 46.

The transfer turret 32 has a drive shaft 60 that is driven from the hub portion 43 of the main turret 25 by a chain 62 that is trained around a sprocket 63 on said hub portion and an idler sprocket 61, and engages a sprocket 64 keyed to the transfer turret shaft 60. Similarly, a drive shaft 65 of the feed turret 31 is driven by the chain 62 which is disposed around a sprocket 66 keyed to the shaft 65. The chain is trained around sprockets 64 and 66 in opposite directions so that the two turrets 31 and 32 are rotated in opposite directions. It will be evident that the three turrets 25, 31 and 32 are intermittently driven in timed relation through the Geneva drive 41.

The weight of the tool carrier plate 27 and its associated mechanism is carried jointly by the cam 49 and a pneumatic counterbalance mechanism which includes an open top cylinder 80, that is secured to the base, and a piston 81 that is slidable in the cylinder. A piston rod 84 is secured to a plate 86 that is bolted to the parallel bars 53, the upper end of rod 84 being disposed between the bars. A generally tubular, flexible, air tight expansible and contractible air reservoir 89 is disposed within cylinder 80 below the piston 81. The reservoir should be made of a thin material that is air tight, pliable, and resistant to citric acid. A material which has been found to be satisfactory is a nylon cloth impregnated with a synthetic rubber such as nitrile. The reservoir 89 has an upper wall secured to the piston 81 and a lower annular end secured between annular flanges 92 of the cylinder. As the piston moves up and down in the cylinder, the reservoir flexes between the upper position shown in full lines to the lower dotted line position. An air conduit 98 extends through the lower wall of the cylinder and communicates with the interior of the air reservoir 89. The conduit 98 is also connected to an air supply such as the usual air bottle or container 99 in which air is maintained at a constant pressure. A manually adjustable pressure regulator (not shown) is provided to vary the air pressure to the reservoir.

When the tool carrier 27 is lowered under the control of the cam 49, air in the closed system below the piston 81 is compressed. Then, when the carrier 27 is again raised, the expanding air applies a lifting force through the bars 53 to augment the lifting force of the cam. By regulating the pressure of the air in the system, an optimum percentage of the weight of the tool carrier will be carried by the pneumatic system. It is desirable that the pneumatic system bear about 80 percent of the weight of the tool carrier 27. With such an arrangement, the machine operates smoothly, and the cam 49 and associated parts are small enough to be efficiently arranged in the base.

Each fruit carrier 30 comprises a prong unit 100 (FIG. 5) that is mounted at the outer end of a mounting bracket 102 which is bolted to the main turret 25. A fruit holder 104 is disposed around each prong unit for gripping the fruit during several of the fruit sectionizing operations. Each holder comprises a rigid ring 106 having a boss 107 which is bolted to a mounting pad 108 on an upwardly projecting arm 109 of the mounting bracket 102. The boss 107 is provided with an air inlet opening 112 which communicates with a passage 113 formed in the bracket 102. A tubular fruit gripper member 115, which is made of thin pliable sheet material, such as the material from which the air reservoir 89 is made, has its upper end clamped in a recess 117 in the upper edge of the ring 106 by a metal clamping band 119. The lower end of tubular member 115 is clamped in a recess 120, formed in the lower edge of ring 116, by a metal clamping band 121. Thus, the tubular gripper member cooperates with the inner wall of the ring 106 to define an annular air chamber 122 which communicates with the air inlet opening 112.

A plurality of spaced hold-down fingers 124 are mounted in the air chamber 122 to prevent the lower end of the tubular gripper from moving upwardly in the space between the ring 106 and the fruit while the gripper is being inflated. The fingers are riveted on a metal band 126 that is secured by screws to the inner surface of the ring 106. The fingers are preferably made from a material, such as rubber, that is flexible so that each finger can swing inwardly using the portion of the finger, that is near the metal band 126, as a hinge. This inward swinging movement of the fingers permits the lower end of the tubular gripper to move inwardly so that a portion of the gripper underlies and supports the lower end of the fruit on the prong unit. In order to make the intermediate portion of each finger relatively stiff, an aluminum strap 128 is riveted to the back side of the finger. These fingers could be made with the metal stiffener molded in the fingers or the cross-sectional area of the central portion of each finger could be increased. The fingers must be stiff enough to act as abutment members to prevent the upward movement of the lower end of the fruit gripper in the space between the fruit and the ring 106, and must be capable of pivotal movement to permit the inward movement of the lower end of the gripper.

Air is forced into the inflatable gripper through the passage 113 in the bracket 102 by the downward movement of a weighted piston 132 that is disposed for vertical movement in a cylinder 131 between an elevated position, shown in phantom lines, and the lower solid line position. The cylinder is mounted on a radially inward portion 133 of the bracket 102 and has a cover 134 held down by long bolts 135 (FIG. 7) and clamp plates 136. The piston has an upstanding cylindrical side wall 137 and a circular base 138 which has an opening therein through which a stud 139, formed on the lower end of a rod 140, projects. A nut 141 is threaded on the stud to secure the piston to the rod 140 and to a transverse wall 142 of a generally tubular flexible element 144. The element 144, which may be made of the same material as the air reservoir 89, is anchored at its lower beaded edge under a peripheral ledge formed on a plate 143 that is secured to the bracket 102. The plate 143 has a central opening 145 which communicates with the reservoir 147, formed in the cylinder below the piston, and with the passage 113 which leads to the air chamber 122 of the inflatable element.

An annular weight 146 is removably positioned in said piston. It will be evident that, if the weight 146 is replaced by a lighter or heavier weight, the pressure exerted by the piston, as it forces the upper wall of the cup-shaped member downwardly and forces air out of the reservoir 147, will be increased or decreased depending upon the selected weight. As will be explained hereinafter, the rod 140 is unlatched and permitted to drop from the elevated position of FIG. 5 when the associated fruit carrier is at Station 2, to inflate the gripper. The gripper remains inflated until after the sectionized fruit has been subjected to the action of the shaker S at Station 10. At that time, a lifting mechanism 148 that is mounted on the overhead, vertically reciprocating tool carrier plate 27, engages the opposite ends of a pin 149 (FIG. 6) on the upper end of the rod 140 and raises the piston 132, causing the air in the gripper to be drawn back into the reservoir 147. When the piston reaches its original elevated position, a latch bar 150 (FIG. 7) which is pivotally mounted on the cover 134 and is held against the side surface of the push rod 140 by a spring 151 connected to hold down bolt 135, automatically moves into an annular groove 140A provided in the rod. At Station 2, the latch bar is moved out of groove 140A in a manner to be described presently, to permit the piston to move downwardly and cause the fruit gripper to be inflated into gripping contact with the fruit on the associated prong unit.

It will be evident that the piston 132 will move downward in the cylinder 131 as far as necessary to cause inflation of the gripper and, therefore, the amount of movement of the piston is determined by the size of the fruit. However, the unit pressure on each fruit, regardless of size, will be constant. It has been found that a pressure of about 0.2 p.s.i. is desirable for gripping treated grapefruit since such pressure will not injure the fruit but will permit the gripper to effectively maintain a gripping engagement with the fruit.

The piston lifting mechanism 148 at Station 10 comprises a pair of rods 160 and 161 (FIG. 6) that are secured in a block 162 (FIG. 5) that is bolted to the tool carrier plate 27. At its lower end, each rod carries a pin 163 on which a latch 164 is pivotally mounted. Each latch 164 has a body portion 165 pivoted on the pin 163, a release arm 166 in the plane of the body portion, and a latching arm 167 offset from said plane. A torsion spring 168 (FIG. 5) is anchored at one end in a pin 169 in each of the rods 160 and 161 and has its opposite end disposed in a slot in the associated pivot pin 163. The torsion spring tends to rotate the pin 163 clockwise (FIG. 5) to bring the upper end of the body portion 165 of the latch against a fixed stop 170 secured to the adjacent bar 160 or 161.

An abutment member 171 (FIGS. 4 and 5) is mounted on a hub 171A clamped on the main post 24 of the machine and has a nylon pad 172 disposed in the path of vertical movement of the two latches 164. When the carrier plate 27 moves upwardly, the two release arms 166 engage the lower curved edge of the nylon pad 172 and are cammed outwardly causing the latches to pivot about the pins 163 and causing the latch rims 167 to move out of engagement with the ends of the pin 149. Just as the pin 149 is released by the two latches 164, the spring loaded latch bar 150 is moved into the groove 140A of the piston rod 140 to prevent downward movement of the piston. In summary, the piston is latched in an elevated position at Station 10 and is released at Station 2 so that the weighted piston 132 can move downwardly and inflate the fruit gripper of the fruit carrier that is at this station.

As previously mentioned, the present invention provides means for cutting a path around the axis of the fruit at the blossom end to completely rupture and remove the peripheral membrane of the fruit and to cut short paths between adjacent radial membranes of the meat segments so that the probes of the sectionizing blades may move laterally, and efficiently seek out the adjacent radial membrane.

Referring to FIG. 8, it will be seen that the path cutting mechanisms include two cutting heads 175 and 176 which are suspended below the tool carrier 27. The head 175 is located at Station 3, and the head 176 is located at Station 2. Both heads are carried by an overhead superstructure 180 (FIG. 8) that is pivotally mounted on the top of the tool carrier 27 in a manner to be described presently. In the position shown in FIG. 8, the carrier 27 is in an upper position just prior to being moved downwardly to carry the various processing tools into engagement with the fruit in the fruit holders. At this time, the entire superstructure and the heads 175 and 176 are supported by the tool carrier 27 through two bushings 181 and 182, each of which is adjustably secured to a rod 184. At its lower end, each rod 184 has a nylon tip 185 disposed directly above an abutment member 187 formed on the fruit holder 104. During the first part of the downward movement of the carrier 27, the superstructure and the heads 175 and 176 move downwardly, causing the fingers on the lower ends of the heads to penetrate into the fruit in the holder about ⅝ of an inch. Each of the nylon tips 185 then engages its associated abutment member 187 and the downward movement of the heads is stopped while the carrier 27 continues downwardly. At this time, the superstructure 180 and the heads are supported by the two rods 184 rather than by the carrier 27. When the tool carrier 27 is elevated, the fingers of the heads remain in the fruit until the carrier engages and picks up the collars 181 and 182, causing the heads to be withdrawn from the fruit. It will be evident that this arrangement permits the fingers of the heads to remain in the fruit for an interval that is relatively long compared to the time they would remain in the fruit if they were mounted directly on the tool carrier 27. This extra long interval of time is used to permit certain fingers of the heads to move laterally to break through the peripheral membrane and the juice sacs of the fruit.

The superstructure 180 comprises a bar 190 (FIG. 8) that is secured to the upper ends of the two rods 184. At each of its ends, the bar 190 carries a cross bar 191 which has two spaced rubber shock absorbers 192 mounted on its upper surface. A second cross bar 194 is mounted directly above each bar 191 on the upper surfaces of the two associated shock absorbers. Secured to the upper surface of each of said second cross bars 194 by capscrews (not shown) is a laterally projecting clamp bar 196 which has a clamp 197 locked on a tubular shaft 198 that extends downwardly through a bearing 200 to the head 175 or 176. The portion of each clamp bar 196, that is directly above and bolted to the adjacent cross bar 194, is slotted to provide two spaced arms 205 and 206. A floating tie bar 208 is disposed in the slot between the arms 205 and 206 of each clamp bar 196. The tie bar 208 has a pair of arms 210 (one only being shown) at each end, one arm of each pair being disposed on each side of the adjacent clamp bar 196. Four posts 212 are secured to the arms 210, one post projecting upwardly from each arm 210. At their upper end the four posts 212 are secured to a plate 214 which rigidly supports two bearing assemblies 215. Near each end, the plate 214 is provided with a guide sleeve 218 in which a rod 220 is slidably journalled. A short shaft 222 is journalled in each bearing assembly 215, one end of the shaft extending into a gear box 224 and the other end being arranged to actuate an eccentric drive unit 225 which is connected through a spring strap 226 to the rod 220. The eccentrics may be of the type disclosed in the copending application for U.S. patent of Wilber C. Belk, Ser. No. 823,107, filed June 26, 1959. The gear box 224 is of the miter gear type having a miter gear (not shown) keyed to each short shaft 222 and meshing with a miter gear keyed to a drive shaft 228 (FIG. 9) projecting outwardly from an intermediate portion. As will be explained presently, when the shaft 228 is rotated the two rods 220 are rapidly vibrated in a vertical direction.

Each rod 220 (FIG. 9) is mounted on the lower end of the spring strap 226 which is connected to the outermost member of the eccentric. The rod 220 is made in two sections, an upper non-rotating section 220A and a lower rotatable section 220B. The two sections are connected by a coupling 230 which includes an internally and externally threaded connector 231 that is locked on the upper threaded end of rod section 220B and a nut 233 that is slidably disposed on the upper rod section 220A. When the nut 233 is threaded onto the connector 231, an annular shoulder 234 formed internally of the nut bears against the top surface of the outer race of a ball bearing assembly 235 which has an inner race mounted on the lower end of the upper rod section 220A, and the upper end of connector 231 bears against the lower surface of the outer race of the bearing to lock the two rod sections for conjoint vertical movement. It is evident of course that the rotary inner race of the bearing makes possible rotation of the lower rod section relative to the upper section.

The lower section of rod 220 extends downwardly through the tubular shaft 198 and is held in spaced relation to the shaft by bushings 236. Near its lower end, the rod 220 has a blade mounting ring 242 that is setscrewed to one of two opposed blocks 246 that extend through openings 247 in the tubular shaft 198 and are secured by capscrews 245 to the rod 220. The blocks have fragmentary cylindrical outer surfaces and V-shaped inner surfaces that grip the rod and prevent relative rotation of these members. The ring 242 (FIG. 10) has a plurality of equi-spaced longitudinally extending grooves 248 that are rectangular in cross section and adapted to receive the rectangular shanks of cutters 249. A capscrew 252 and a washer 253 lock each adjacent pair of cutters in their grooves. The cutters 249 are made of resilient material, such as spring steel, so that they will spring back if they have been flexed laterally. As seen in FIG. 10, the lower portion 250 is inclined relative to the upper portion 251.

A second ring 260 is secured to the rod 220 by capscrews 261 (FIG. 9) which extend through the ring 260 and through clamp blocks 262 that are identical to clamp blocks 246 and are disposed in openings 263 in the tubular shaft 198. The second ring 260 has a lower annular flange 264 in which a plurality of equi-spaced grooves 265 are formed. The lower inclined end portion of each resilient cutter 249 extends through one of the grooves 265, with the inclined side surface of the cutter engaging a wall 265A of the groove, said wall being disposed in a radial plane that is spaced about .025" from a radial plane passing through the wall 248A of groove 248 in upper ring 242. Since the inclined lower portion 250 of the cutter 249 bears against the groove wall 265A, the upper portion 251 will be flexed laterally and stressed.

As previously mentioned, each of the tubular shafts 198 is held in one of the clamps 197 so that it cannot rotate relative to the superstructure 180 which rotatably mounts the rod 220. Each shaft 198 is slidably journalled in bushings 270 in the housing 200 mounted on the tool carrier 27. At its extreme lower end, the shaft 198 carries a ring 275 from which depend a plurality of rigid metallic probes or stabbers 276 which will be referred to hereinafter as stabbers since they have lower rounded ends 277 which are adapted to break through the peripheral membrane at the blossom end of the grapefruit and penetrate about ⅝" down into the fruit when the head is moved downwardly. Since the shaft 198 is non-rotatable, the stabbers will go straight into the fruit and will not move laterally.

As seen in FIG. 11, each stabber has three notches 276A in one face and has one notch 276B in the opposite face 276C which is flat and disposed in a generally vertical plane. At its upper end, the stabber has a flat surface 276D disposed in a plane spaced .010 of an inch from the plane of face 276C. Since the stabbers do not vibrate, the notches 276A and 276B come into operation only when the head is lifted upwardly to withdraw the fingers and the stabbers from the fruit. During this withdrawal, the generally horizontal ledge provided for the lower side of each notch engages any membrane particle in its path and lifts it away from the fruit. Each vertically vibrating resilient cutter 249 cooperates, in the membrane breaking operation, with the adjacent stabber that has its relatively smooth one-notch face confronting the cutter. The cutter 249 has a lower smooth vertical face 249A and an upper notched face 249B that is disposed in a plane parallel to the plane of face 249A but spaced .010" therefrom. As will be explained presently, during operation, the vibrating cutter 249 moves toward the stationary stabber. During this movement, the notched portion 249B of the vibrating blade cuts into any peripheral membrane and the juice sacs disposed in its path. When the cutter 249 reaches the stabber, the recessed notch portion 249B will not contact the stabber since the smooth face 249A will reach the stabber first. Each cutter has two notches formed in face 249C. These notches act in a manner similar to the notches of the stabber to engage and remove particles of membrane disposed in the path of upward movement of the notches as the head is lifted out of contact with the fruit.

In FIG. 10 the position of the stabbers 276 and the cutters 249 are shown when the head is ready to be lowered into the fruit. In this position each prestressed cutter, which is rapidly vibrating vertically, has been moved laterally causing its relatively smooth face 249A to be spaced from an adjacent stabber. To attain this position, the rod 220 and the two rings 242 and 260 have been rotated counterclockwise by means of a solenoid-controlled pneumatic power cylinder 280 (FIG. 8) that has an actuating rod 281 connected to a crank arm 283 that is keyed to rod 220. When the solenoid is de-energized, the air cylinder holds the two rings 242 in the position of FIG. 10 with the resilient cutters 249 spaced from the stabbers. After the head has been lowered and the cutters and stabbers are approximately ⅝ of an inch down in the fruit, the solenoid is energized and the air cylinder is actuated, causing the rod 220 and the rings 242 and 260 to be rotated clockwise. The upper ends of the flexible cutters 249 move with the ring 242. Although the lateral movement of the vertically vibrating cutters 249 is resisted by the fruit and by the peripheral membrane at the blossom end of the fruit, the force with which each cutter moves laterally due to its prestressed condition and due to the rotation of the ring 242 is such that the lower end of each cutter moves laterally toward a position against the adjacent stabber. If the lower end of the cutter does not engage a radial membrane, it will move into close proximity to the associated stabber. If the cutter 249 engages a membrane, it will stop, and the smooth face 249A of the cutter will maintain contact with the membrane until the cutter is withdrawn from the fruit.

In FIG. 12, four pie-shaped meat segments S1, S2, S3, and S4 of a grapefruit are illustrated. In segment S4 a condition is illustrated wherein the stabber 276–1 and the cutter 249–1 enter the same segment. Then, when the solenoid is energized, the cutter 249–1 moves laterally to the dotted line position against the stabber. In segments S1 and S2 a condition is illustrated wherein the stabber 276–2 enters on one side of a radial membrane M and the cutter 249–2 enters on the other side of the membrane. Then when the solenoid is energized, the finger will move laterally to the dotted line position in contact with the membrane. The membrane can yield slightly and accordingly it will be pushed over against the stabber. With twelve stabbers on each head, no membrane will be flexed laterally far enough to rupture it. Thus, under all conditions, the stabbers act as flat abutments which stop the lateral movement of the rapidly vibrating cutters. Since a backing member is provided there is no danger that the relatively flat face of the cutter will rupture the radial membrane of the fruit. During the lateral movement of the vibrating cutter 249 toward the associated stabber, the lower end of the cutter moves in repeated vertical strokes from a position approximately ⅛" above the lower end of the stabber to a position approximately ⅛" below the lower end of the stabber.

As mentioned previously, the two path cutting heads 175 and 176 are substantially identical. However, it is to be noted that, in the head 175 (FIG. 10) at Station 3, the rings 242 and 260 are moved counterclockwise to space each cutter 249 from its associated stabber. Accordingly, after rings are rotated counterclockwise to stress the cutters, they are returned in a generally clockwise path toward the stabbers. The arrangement of the cutters and stabbers of head 176 at Station 2 is opposite to the arrangement of the head 175 in that the rings 242 and 260 of head 176 are moved clockwise, by a solenoid-controlled air cylinder 284 (FIG. 8) connected to a crank 285, to space each cutter from its associated stabber. Accordingly, each cutter must move in a counterclockwise path to reach its associated stabber. Another difference between the heads 175 and 176 is that the head 176 is rotated around its axis a short distance so that the stabbers of head 175 do not enter the fruit at the same points that the stabbers of head 176 have entered but enter at points spaced about half the width of a stabber from said initial points. Referring again to FIG. 12, if stabber 276–3 were on head 176, stabber 276–4 on head 175 would enter the fruit at the position indicated by dotted lines. It is to be noted, that while cutter 249–3 moved toward the left to engage stabber 276–3, cutter 249–4 will move toward the right to engage stabber 276–4.

Due to the lateral movement of each cutter under individual spring pressure, the rapid vibration of each cutter as it moves laterally, the notches on the stabbers and the cutters, the movement of the cutters of the two heads in opposite directions, and the staggered relative positions of the two heads, the peripheral membrane at the blossom end of the fruit is completely broken, and any loose particles of the membrane and particles of juice cells are lifted away from the fruit. Accordingly, at Stations 4–9 the movement of the sectionizing blades is not restricted by the peripheral membrane and they can efficiently carry out the separation of the meat segments from the radial membranes of the fruit.

Referring to FIG. 10, it will be evident that the stress in the upper portion of each cutter can be varied by shifting collar 242 up or down on shaft 220 since such movement will change the point of contact of the inclined lower end of the cutter. Also, the stress in the cutter can be changed by changing the angle of inclination of the lower inclined portion of the cutter.

As previously mentioned, at Station 2 the latch bar 150 is moved out of the notch in shaft 140 to permit the piston to move downwardly to inflate the fruit gripper 115. Since the gripper 115 should be inflated only if there is a grapefruit in the carrier, a fruit sensing unit 286 (FIGS. 8 and 9) is positioned at Station 2 and includes a rod 287 that is slidably journalled in a boss 288 formed on the housing 271. At its lower end the rod carries an arcuate fruit-contacting member 289, and at its upper end the rod carries a member 290 that has a slanted upper edge 291 adapted to engage and actuate an arm of a switch 293 (FIG. 8). When the switch is actuated, it energizes the solenoid of a solenoid-controlled air energized power cylinder 294 (FIG. 7) which is mounted on the under side of the tool carrier 27 at Station 2. The air cylinder 294 is shown in phantom lines in FIG. 7 because FIG. 7 actually illustrates the mechanism at the shaker station, Station 10. It will be clear from FIG. 7 that, when the air cylinder 294 is actuated, the latch bar 150 will be withdrawn from engagement with the rod 140, and this action takes place only when there is a fruit in the fruit carrier at Station 2.

The sectionizing heads H1–H6 at Stations 4–9 are all identical and are substantially identical to the sectionizing heads disclosed in the copending application for U.S. patent of Wilber C. Belk, Ser. No. 823,107, which was filed June 26, 1959, now Patent No. 3,105,531, and assigned to the assignee of the present invention. Also, the blade vibrating mechanism is substantially the same as that disclosed in said application, however, it has been enlarged to provide a vibrating drive for six heads rather than for four as disclosed in said application.

As seen in FIGS. 13 and 14, each head comprises a rigid support ring 300 that is bolted to the tool carrier 27 and has a central opening 301 in which a ring 302 is rotatably mounted in a bearing assembly 303. Five blade carrier units 306 are mounted on the support ring 300 and, since these units are identical, only the one unit illustrated in FIG. 14 will be described in detail. Each carrier unit is provided with a shaft 310 which has an upper square end 310A bolted to one of five identical rigid blocks 312 bolted to the upper surface of ring 300. A blade carrier member 314 has a tubular portion 315 journalled for rotation on the fixed shaft 310 by means of ball bearing units 316. A torsion spring 313 that is anchored in the fixed shaft 310 and to the upper end of tubular portion 315 tends to pivot the member 314 about shaft 310. The carrier member 314 has two laterally projecting arms 317 and 318, each of which is provided, near its outer end, with an opening 319 in which a bushing 320 is disposed. These spaced openings 319 slidably receive a tubular shaft 325 which is part of a blade support unit 326. The unit 326 includes a housing 327 that encloses the shaft 325 and is secured, as by welding, to an upper arm 330 and a lower arm 331. Each of the arms 330 and 331 has an opening in which the tubular shaft 325 is secured by a setscrew (not shown). Thus, the shaft 325, the arms 330 and 331, and the housing 327 form a rigid blade carrier that is mounted for vertical sliding movement at the outer ends of arms 317 and 318 of control member 314. The upper arm 330 has a rearwardly projecting portion 332 which is slidably disposed in a vertical channel 333 defined by two spaced guide blocks 334 (FIG. 16) that are integrally formed on a plate 335 that is bolted to the under side of arm 318. The blocks 334 are made of plastic. The spaced blocks 334 permit vertical reciprocating movement of the blade support unit 326 but prevent rotation of the unit relative to the carrier member 314.

Each of the arms 330 and 331 has a pivot pin 340 which is pressed in its outer end portion and projects through an elongate opening 341 cut in the side of a vertical tube 342. The pivot pin in the lower arm 331 has a conical point pivotally seated in a bearing 344 that is disposed in the tube 342, which tube also receives a rod 345 projecting upwardly from a sectionizing blade 347. The rod 345 is secured to the blade 347 by rivets 348 and to the tube 342 by rivets (not shown). The pivot pin 340 on the upper arm 330 has a conical point pivotally engaged in a bearing 352 which is slidably disposed in the upper end of the tube 342. The upper end of tube 342 is internally threaded to receive an adjusting screw 355 that bears against the slidable bearing 352. The screw 355 has a screw driver slot in its upper end and, by rotating screw 355, the bearing 352 can be adjusted to lock the blade on the support unit 326 for free pivotal movement about the axis defined by the pivot pins. A locknut 356 is threaded on the upper end of the adjusting screw 355 to lock it in selected position.

All five blades 347 of each head are simultaneously vibrated in a vertical direction by means of an eccentric drive mechanism 365 (FIG. 13) which includes a circular plate 366 having five equally spaced depending universal joints 367. Each joint receives a ball (not shown) on the upper end of a rod 370 which has a ball 371 (FIG. 14) secured to its lower end and forming part of a universal joint 372 that is secured to the upper end of tubular shaft 325. The universal joints 367 and 372 are identical but oppositely disposed and, besides the balls formed on the rod 370, each joint includes an internally threaded sleeve 380 which receives the threaded shank of the shaft 325, or the shank of a bolt 381 (FIG. 13). The ball pivot member 371 is disposed between two seat members 383 and 384 (FIG. 14), and a tubular retainer screw 386 is threaded into the sleeve 380 to hold the members of the joint in operative association.

The circular plate 366 (FIG. 13) is secured to a short shaft 390 which is slidably journalled in bearing members 391 and 392 that are secured to a support platform 395. The platform 395 is rigidly connected to the tool carrier 27 by a plurality of upstanding posts 396. The short shaft 390 is connected by a bolt 397 to a spring strap 398 which, as seen in FIG. 15, is bolted to the lower end of an eccentric mechanism 400 which is identical to the previously mentioned eccentric drive unit 225 (FIG. 8).

The drive mechanisms for the eccentrics at each head, as well as the two eccentrics 225 at the path cutting Stations 2 and 3, are shown in FIG. 15. A motor 410 is mounted on the tool carrier 27 and drives a shaft 411 through a belt and pulley drive 412. The shaft 411 is mounted in bearings 413 that are secured on a plate 414 which is rigidly connected to and supported from the tool carrier 27. At one end 411A, the shaft 411 is operatively connected to the eccentric 400 associated with the sectionizing blades at Station 4. At its other end, the shaft is operatively connected to the eccentric at Station 7. A second shaft 416 is mounted on plate 414 and is driven by a belt 417 from shaft 411. At its opposite ends, the shaft 416 is operatively connected to the eccentrics at Stations 5 and 6. The motor 410 also drives two shafts 420 and 421 through a belt and pulley drive mechanism 422. These shafts are rotatably mounted in bearings on the plate 395, the shaft 420 being operatively connected to the eccentric at Station 8 and the shaft 421 being operatively connected to the eccentric at Station 9. The shaft 420 also drives a short shaft 425 through a belt 426. This short shaft, which is journalled in bearings on plate 414, has a flexible coupling 430 connected to one end. This coupling may be of any commercial type having a drive shaft 431 that is rotatably driven by the input shaft 425 and can swing upwardly in a generally vertical direction. One suitable coupling is known as the Dodge Para-flex coupling and consists of a hollow rubber ring to the opposite sides of which plates connected to the two shafts are secured. The drive shaft 431 is connected by a coupling 432 to the shaft 228 projecting from the gear box 224 (FIG. 9). Accordingly, the rotary shaft 431 drives both eccentrics 225 of the path cutting heads 175 and 176 at Stations 2 and 3. In summary, the motor 410 drives the various shafts of the mechanisms that vibrate all the blades of all the sectionizing heads and the resilient fingers of the path cutting heads.

During the actual separation of the meat segments from the enclosing radial membranes of the fruit, each blade 347 is first moved downwardly about one-half inch into the fruit and is then moved laterally to find an adjacent radial membrane of the fruit. This lateral movement of the blade is effected by the torsion spring 313 (FIG. 14). In order that the blade can make this lateral movement, a cocking mechanism is provided for moving each blade rearwardly against the resistance of a spring. This cocking mechanism comprises a solenoid controlled air operated air cylinder 440 (FIG. 3) that has a push rod 441 pivotally connected to a post 442 which, as seen in the head illustrated in FIG. 14, projects upwardly from a ring 443 that is rigidly secured by posts 444 to the rotatable ring 302 of each sectionizing head. The ring 302 has a U-shaped member 448 which has two legs, one disposed on each side of the tube 325 projecting upwardly from each blade support unit 326. When the ring 302 is rotated, the U-shaped member engages the tube 325 and pivots the blade control member 314 about the axis of shaft 310 to move the blade to the cocked position.

In the present machine, the rings 443 of all six sectionizing heads are connected so that the air valve 440 will cock all six heads simultaneously. This connection comprises a rod 450 (FIG. 3) pivotally connected between the rings 443 of the heads at Stations 4 and 5, a rod 451 connected between the rings of Stations 5 and 6, a rod 452 connected between the rings of Stations 6 and 7, a rod 453 connected between the rings of Stations 7 and 8, and a rod 454 connected between the rings of Stations 8 and 9. It will be noted that the rings at Stations 7, 8 and 9 are rotated in an opposite direction to the direction of rotation of the rings of Stations 4, 5 and 6. Accordingly, as seen in FIG. 12 wherein the reference letters FM indicated the forward membrane of meat segment S2 and RM indicates the rear membrane, just before the probe of a blade at Stations 4, 5 and 6 enters such a segment, it will be moved to the right to a cocked position. Then when the blade is released by the cocking mechanism, it will move to the left to seek out the forward membrane FM. Blades at Stations 7, 8 and 9 will seek out the rear membrane RM.

It is necessary that, when a blade contacts a radial membrane and is ready to be moved downwardly through the fruit, it be in a position parallel to or overlying the membrane at about a 5 degree angle as indicated by angle X in FIG. 17. Accordingly, a blade orienting mechanism 474 is provided in the present machine for maintaining the blade at this desirable angle relative to the radial membrane so that the blade will at all times be in position to be moved downwardly as soon as it contacts a membrane.

Referring to FIGS. 14 and 17, it will be seen that an arm 475 is provided with a split end portion that is clamped on the fixed shaft 310 by a bolt 476. Also, the lower arm 318 of the blade carrier member 314 has an opening in which a bolt 477 is adjustably secured. A pin 478, whose axis is spaced from the axis of the bolt 477, projects downwardly from the bolt and projects through a slot 480 (FIG. 17) in a lever 481 that is pivotally mounted by means of a ball bearing assembly 482 on a capscrew 483 that is threaded in the fixed arm 475. At its free end, the lever 481 has an arm 485 which is slanted relative to a longitudinal centerline of the lever. The slanted arm bears against one side of a pin 486 that is secured to and projects upwardly from the blade 347. A torsion spring 488 has one end portion bearing against the opposite side of the pin 486 and the other end wrapped around a cylindrical shank of a nut 490 (FIG. 14) that is locked to the lever 481 by a capscrew 491. The circular nut has a peripheral flange in which the end of the torsion spring is anchored. It is to be noted that the force with which the spring bears against the pin 486 can be varied by loosening the capscrew 491, rotating the nut, and locking the nut in the newly selected position. Also, it will be noted that by rotating the bolt 477, the eccentric pin 478 will move relative to a longitudinal centerline of the arm 318 and, accordingly, the lever 481 will be pivoted about its pivot axis. Thus, by means of the eccentric pin the initial position of blade 347 may be varied.

When the blade carrier member 314 (FIG. 14) is being cocked as mentioned above, it is rotated clockwise about shaft 310 (FIG. 17). During this movement, the pin 478 moves with the member 314 causing the lever 481 to pivot about the axis of capscrew 483. In FIG. 18, one uncocked position of the member 314 is shown. It will be noted that the blade 347 has been pivoted clockwise about the axis W defined by the pivot pins 340 (FIG. 14) but has maintained the angle between the blade and a radial membrane of the fruit substantially constant.

After the blade 347 moves over into contact with a radial membrane of the fruit and is overlying the membrane, it is moved downwardly through the fruit. During the first part of this downward movement, the contact of the lower curved edge 495 (FIG. 14) of the blade with the top edge of the radial membrane will cause the blade to pivot about axis W bringing the blade to a position close against the face of the membrane from which the meat segment is being separated. Under some conditions, particularly when the membrane is not disposed generally radially of the fruit, the membrane tends to push the entire arm back before the blade can pivot about axis W and turn to a position parallel to the membrane. To overcome this difficulty a brake mechanism is provided which comes into operation immediately after the blades have been released from their cocked position and have moved laterally into contact with the adjacent membrane. The brake engages each pivotal blade control member 314 and holds it in whatever position it is in when the associated blade "finds" the membrane, and this braking of the pivotal control members is maintained until the blades have moved far enough down into the fruit to cause them to pivot about axis W and attain a position parallel to the membrane. Usually the blade will have attained the necessary position after it has completed about one-third of its movement down through an average grapefruit.

Each head has a separate brake mechanism which comprises a metal ring 500 (FIGS. 13 and 14) which encircles the hold down rod 501 of the head and extends through the opening in each blade control unit 314 defined between the upper and lower arms 317 and 318 respectively. A rubber ring 503 is secured to the upper surface of the metal ring as by a suitable adhesive or capscrews. When the ring 500 is raised, the rubber ring 503 engages the lower surface of the plastic guide blocks 334 formed on the plate 335 that is bolted to the upper arm 317 of the blade control member 314, thus locking the control member 314 against pivotal movement.

The upward movement of the brake ring is accomplished by a solenoid-controlled, air operated power cylinder 510 (FIG. 13) that is supported by the support platform 395 and has a rod 511 threaded into a block 512 which is pivotally connected by a pin 513 (FIG. 14) to a tab 514, the tab being welded to and projecting upwardly from a cross bar 515. At each end, the cross bar 515 has an aperture 516 which receives a lift rod 517 which is slidably journalled in a tubular post 518 that is mounted in fixed position on the outer ring 300 of one of the heads. A nylon washer 520 is disposed between each post 518 and the cross bar 515, and a similar washer 521 is disposed between the bar 515 and a pin 523 which extends transversely through the upper end of the rod 517 and has an end portion disposed in a vertical slot in the block 512. When the air cylinder 510 (FIG. 13) is actuated, the rod 511 is raised causing the lift rods 517 of two heads to be elevated to raise the rubber brake rings into contact with the plastic guide blocks 334 of the two heads.

After the blade has covered about one-third of its vertical movement down through the fruit, the brake is released by deactuating the air cylinder. Release of the brake after the blade has finished turning is necessary because in some cases the partitions are out of plumb, and the arm must be free to allow the blade to follow the partition in such cases.

Referring to FIG. 13, it will be noted that the tubular portion 315' of the blade control unit 314' is tilted at an angle of between 2 to 4 degrees relative to a vertical radial plane of the head as indicated by centerline CL. While most of the partitions of a grapefruit are parallel to the core axis, some of the partitions grow so that they are out of plumb when the fruit is on the spindle and, in some cases, the core of the fruit may not be perfectly centered in the spindle, causing some of the partitions to be out of plumb. As seen in FIG. 19, if a membrane M1 is inclined, a vertical blade VB will follow path P1 and will not contact the face F1 near the lower end of the membrane and fruit will be wasted at this point. On the other hand, if a canted blade CB is used, it will follow the path P2 and will stay close to the surface of the membrane as the blade moves downwardly. An inclination in the range of from 2 to 4 degrees relative to the vertical will not cause the blade to puncture the membrane even if the membrane is inclined in a direction opposite to the inclination indicated in FIG. 19.

As previously mentioned, each of the six sectionizing heads has five equally spaced blades. Accordingly, the blades penetrate a grapefruit along radial lines spaced approximately 72 degrees away from each other. The blades of the first three heads are staggered realtive to each other so that the 15 blades of these heads penetrate the fruit at 24 degree intervals around the entire core of the grapefruit. Similarly the 24 blades of the second three heads are staggered so that these blades penetrate the fruit at 24 degree intervals around the core.

When the grapefruit reaches Station 11 it has been subjected to the segment-stripping action of all of the blades of the six heads. At this time most of the pie-shaped segments of the fruit are completely separated from the membranes of the fruit and some of the seeds have been loosened from the segments. Accordingly, while the grapefruit is still retained in place by the inflated gripper, a group of small diameter pins 520 (FIG. 20) are inserted down into the fruit adjacent the apices of the sections as seen in FIG. 12. The nine pins 520 are arranged in a circular pattern and are mounted on the lower end of a shaft 521 that is rotatably journalled in a rigid support bearing 522 carried by the tool carrier 27. At its upper end, the shaft 521 passes through a tubular drive member 525 which is continuously oscillated, in a manner to be explained presently. At a point above the member 525, a cylindrical clutch member 527 is keyed to the shaft below a coil 528. The oscillating drive member 525 and the member 527 are parts of an electric clutch unit 530. When the clutch is energized, the drive member 525 is coupled to the member 527 to cause the shaft 521, and the pins 520 on the lower end thereof, to be rapidly oscillated at about 1400 cycles per minute in a range of from 15 to 30 degrees. This oscillating movement of the pins causes the pins to repeatedly contact that portion of the seeds disposed outwardly of the meat segments, and preferably near the outer ends of the seeds. It will be understood that, while the shaker is oscillating and breaking loose the seeds, the inflatable gripper is in the inflated condition and holds the separated segments together. While the shaker is still oscillating, the tool carrier 27 is raised, causing the piston 132 (FIG. 5) to be raised to effect the deflation of the gripper. The shaker pins 520 are long enough so that they are still in the fruit when the holder is deflated. Accordingly, as a last operation, the oscillating pins 520 jar the pie-shaped fruit segments that have already been separated from their membranes but have been held together by the adhesion of the segments to each other. These loose sections then fall onto a conveyor system for further processing.

The drive member 525 of the clutch is oscillated by means of a crank plate 530 (FIG. 15) that is keyed to the output shaft 531 of a drive unit 532. The input shaft 533 of the drive unit is driven by a belt and pulley mechanism 534. The crank 530 is connected by a rod 537 to a crank arm 538 that is integrally formed on the drive member 525. The crank arm 538 is long compared to the throw of the crank 530 and, accordingly, the crank arm 538 will be oscillated while the crank 530 is rotated.

At Station 11, the fruit is subjected to the action of the spinner T (FIG. 20) which comprises a plurality of pins 551 mounted on the lower end of a vertical shaft 552 which is rotatable in a fixed bearing 553. The upper end of the spinner shaft 552 passes through the drive member 555 of an electric clutch 556 and has the driven member 557 keyed thereon below a coil 558 and above the drive member which is continuously rotated by a belt and pulley drive mechanism 560 which has a belt 561 trained around a pulley 562 that is keyed to the output shaft 531 of the drive unit 532.

When the stripper pins 551 are lowered into the fruit, the clutch 556 is energized to cause the rotation of the pins which wrap the radial membranes of the fruit around the pins and strip the remaining meat segments from the membranes.

At Station 12, the core and the membranes are removed from the prong unit by means of a core removal unit that is disclosed in the above-mentioned copending Grotewold application Ser. No. 730,335.

It will be understood that each of the solenoid-controlled air operated power cylinders mentioned herein consists of a pneumatic power cylinder, a valve arranged to control the flow of pressurized air to the cylinder, and a solenoid which shifts the valves of the various units. The solenoids associated with the air cylinder 440 (FIG. 3) of the blade cocking mechanism, the cylinders 280 and 284 (FIG. 8) of the path cutting units, the blade brake cylinder 510 (FIG. 13), the shaker clutch 530 (FIG. 20) and the spinner clutch 556 are all controlled from a central cam and switching unit (not shown) that has a cam shaft driven from the vertical drive shaft 39 (FIG. 4). A separate cam is mounted on the cam shaft for each of the above-mentioned solenoids and each cam actuates a separate microswitch that is electrically connected to the solenoid. Since the cam shaft is driven from the vertical shaft 39 (FIG. 4), it is evident that the actuation of the various air cylinders takes place in timed relation with the indexing of the turret and the vertical movement of the tool carrier.

During the operation of the machine, while the main turrent is stationary and the overhead tool carrier plate 27 is moved downwardly during a processing stroke, a fruit is positioned within a deflated fruit gripper and impaled on a prong unit 100 (FIG. 5). The tool carrier 27 is then raised, and the turret is indexed to bring the fruit to Station 2. As the tool carrier 27 moves down again, the air cylinder 294 is actuated, causing the latch bar 150 to release the piston of the pneumatic fruit gripping system, permitting the piston to move downwardly in its cylinder to force air into the inflatable gripper that encircles the fruit. When the gripper has been inflated into gripping contact with the fruit, the path cutting head 176 (FIG. 8) at Station 2 moves into engagement with the stationary fruit. The stabbers 276 (FIG. 10) and the fingers 249 (FIG. 8) of the path cutting head 176 have been previously moved to spaced apart position by the air valve 284 (FIG. 8). Then, as the tool carrier moves down, the stabbers and fingers move about five eighths of an inch down into the fruit at the apices of the pie-shaped meat segments. When the stabbers have penetrated to this depth, the air valve 284 is actuated to release the spring-loaded fingers, permitting them to move under individual spring pressure toward the associated stationary stabber to cut a path through the peripheral membrane of the fruit. The tool carrier is again raised, and the turret is indexed, to bring the grapefruit under the second path cutting head 175, the resilient fingers 249 of which have been moved to a position spaced from the associated stabbers. As the tool carrier is again lowered, the stabbers and fingers of head 175 enter the fruit to a depth of about 5/8 of an inch, at which point the resilient fingers are released and permitted to cut a path to the associated stationary stabber. When the tool carrier is elevated, the head 175 is raised out of the fruit. At this point, a circular path has been cut into the fruit around the core leaving the radial membranes intact.

At Stations 4–9, the blades of the six sectionizing heads move downwardly through the grapefruit to separate the pie-shaped segments of the fruit from the adjacent radial membranes. Since the path cutting heads 175 and 176 have provided a circular path in the fruit, the probes at the lower ends of the blades are able to move laterally and "find" the adjacent radial membranes.

Also, during the segment separating operation of the blades, the blade orienting mechanism 474 (FIG. 17) keeps the blade at an optimum angle relative to the radial membranes of the fruit. The novel brake mechanism prevents rearward pivoting of the blade carrier arm until the blades have been automatically swung to a position parallel to the membrane from which the segment is being stripped. The inclined or canted position of the blade control member make certain the close contact of the blades and the membrane even when the membranes are not altogether parallel to the axis of the prong unit on which the fruit is impaled.

When the fruit reaches Station 10, the shaker pins are moved down into the fruit and rapidly oscillated a few degrees to shake the seeds loose from the fruit segments. As the shaking continues, the fruit gripper is deflated when the lifting mechanism 146, which engaged the piston rod 140 on the downstroke of the tool carrier, elevates the piston 132 and draws the air out of the inflatable fruit grippers and returns it to the air reservoir formed below the piston. At this time most of the loose seed and fruit sections are discharged from the fruit structure.

At Station 11, the spinner T engages the core and wraps the core and the radial membranes around the spinner, thus stripping the remaining segments from the core.

At Station 12, the core remover R engages and removes the core from the prong unit.

Having thus described my invention, what I claim as new and desire to protect by Letters Patent is:

1. In a method of sectionizing peeled citrus fruit having a plurality of generally pie-shaped segments disposed around a central axis, each segment being enclosed by two generally radially disposed membranes, the steps of holding a fruit in fixed position, making a plurality of cuts around the blossom end of the fruit, each cut extending through the peripheral membrane and into a portion of one of the meat segments and extending from one radial membrane to the adjacent membrane, removing the loose material from said cuts to provide short paths between the radial membranes, and making cuts between each radial membrane of the fruit and the adjacent meat segment, each cut extending from the point where one of said paths meets a membrane to the periphery of the fruit.

2. A method of preparing a citrus fruit for a sectionizing operation, comprising the steps of holding a peeled fruit in fixed position with its stem-blossom axis disposed generally vertical and with its blossom end facing upwardly, making a plurality of punctures in the peripheral membrane of the fruit at spaced points around the axis of the fruit at the blossom end thereof, said punctures defining a circular line around the axis, making a second plurality of punctures in the peripheral membrane, each second puncture being spaced from said first puncture and being disposed on said circular line, and extending each of said second punctures along said line to the adjacent first puncture.

3. A method of preparing a citrus fruit for a sectionizing operation comprising the steps of holding a peeled fruit in fixed position with its stem-blossom axis disposed generally vertically and with its blossom end facing upwardly, making a group of first punctures in the peripheral membrane of the fruit at spaced points around the axis of the fruit at the blossom end thereof, said punctures defining a circular line around the fruit axis, making a group of second punctures in said peripheral membrane, each of said second punctures being disposed on said circular line and spaced from an adjacent first puncture, extending each of said second punctures along said circular path in one direction to the adjacent first puncture, making a group of third punctures in said peripheral membrane partially overlying said first punctures, making a group of fourth punctures in said membrane, each fourth puncture being spaced from one of said third punctures, and extending each of said fourth punctures to the adjacent third puncture, the extension of said fourth punctures toward said third punctures being in an opposite direction to the direction of extension of said second punctures toward said first punctures.

4. In a method of sectionizing a peeled citrus fruit the steps of gripping the periphery of a fruit and exerting a radial inward pressure thereon, making cuts through the fruit between each radial membrane and the adjacent meat segment while maintaining the pressure on said fruit to hold in segments together, repeatedly contacting the seeds around the core of the fruit to jar the seeds loose from the meat segments of the fruit, releasing the pressure on the fruit to permit loose seeds and segments to drop away from the core and the membranes of the fruit, and continuing the jarring of the seeds and segments after the pressure on the fruit has been released.

5. In a method of sectionizing citrus fruit having a peripheral membrane and a plurality of generally pie-shaped meat segments, each of which is defined by two generally radially disposed membranes and wherein said method includes a step of inserting a sectionizing member into each of a plurality of the meat segments at the apex of the pie-shaped segment and moving the sectionizing member across the apex into engagement with one radial membrane defining the segment, the improvement which comprises making a preliminary opening in the pie-shaped segment adjacent the apex thereof, and extending the opening to one of the membranes defining the segment whereby a path is provided for the sectionizing member as it is subsequently moved into contact with the membrane.

6. In a method of sectionizing peeled citrus fruit having a plurality of generally pie-shaped meat segments disposed around a center axis, each segment being defined by two spaced generally radially disposed membranes, the steps of holding a peeled fruit in fixed position with its axis having a predetermined orientation, making a puncture through the peripheral surface of each of a plurality of the pie-shaped segments of the fruit and extending each puncture laterally to an adjacent radial membrane to provide a path across the apex of each punctured segment of the fruit, each path extending through a portion of one of the pie-shaped segments that is close to but spaced radially from the apex of the segment, inserting a membrane detecting member into said path and moving said member into contact with a radial membrane at the end of said path, and separating the meat portion of each of said pie-shaped segments from the adjacent radial membranes.

7. In a method of sectionizing peeled citrus fruit having a peripheral membrane and a plurality of generally pie-shaped segments disposed around a center axis, each segment being defined by two spaced and generally radially disposed membranes, the steps of holding a peeled fruit in fixed position with its axis having a predetermined orientation, making a plurality of openings through the peripheral membrane around the axis at one end of the fruit, each opening extending through a portion of one of the pie-shaped meat segments adjacent the apex thereof and extending to one of said radial membranes, inserting a sectionizing blade into each opening and moving the blade into contact with the radial membrane at the end of the opening, and forcing the blade between said radial membrane and the meat segment to separate the meat segment from the membrane.

8. In a method of sectionizing a peeled citrus fruit having a plurality of generally pie-shaped meat segments, each of which is enclosed by two substantially radially disposed membranes, the steps of gripping the periphery of a fruit and exerting a radial inward pressure thereon, separating each radial membrane from the enclosed meat segment, and repeatedly contacting the seeds of the fruit adjacent the radially inner edges of the pie-shaped segments to jar the seeds loose from the meat segments.

9. In a method of sectionizing a peeled citrus fruit having a plurality of generally pie-shaped segments, each of which is enclosed by two substantially radially disposed membranes, the steps of exerting an inward pressure on the periphery of the fruit to hold it in compact form, separating each radial membrane from the enclosed meat segment, and repeatedly contacting the seeds of the fruit adjacent the radially inner edges of the pie-shaped segments to jar the seeds lose from the meat segments.

10. In a method of sectionizing a peeled citrus fruit having a plurality of generally pie-shaped segments, each of which is enclosed by two substantially radially disposed membranes, the steps of exerting an inward pressure on the periphery of the fruit to hold it in compact form, separating each radial membrane from the enclosed meat segment, and repeatedly contacting the seeds of the fruit adjacent the radially inner edges of the pie-shaped segments to jar the seeds loose from the meat segments while maintaining the inward pressure on the fruit.

References Cited by the Examiner

UNITED STATES PATENTS

| 2,121,097 | 6/1938 | Polk et al. | 146—238 |
|-----------|--------|-------------|---------|
| 2,121,098 | 6/1938 | Polk et al. | 146—3 |
| 2,243,025 | 5/1941 | Wilson | 146—3 |
| 2,549,333 | 4/1951 | Polk et al. | 146—236 |
| 2,627,884 | 2/1953 | Polk et al. | 146—3 |
| 3,030,990 | 4/1962 | Polk | 146—3 |
| 3,045,729 | 7/1962 | Belk et al. | 146—3 |
| 3,072,160 | 1/1963 | Grotewold | 146—3 |

ROBERT C. RIORDON, *Primary Examiner.*

J. SPENCER OVERHOLSER, *Examiner.*

W. G. ABERCROMBIE, *Assistant Examiner.*